(12) United States Patent
Baarman

(10) Patent No.: US 7,462,951 B1
(45) Date of Patent: Dec. 9, 2008

(54) PORTABLE INDUCTIVE POWER STATION

(75) Inventor: David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 509 days.

(21) Appl. No.: 10/915,922

(22) Filed: Aug. 11, 2004

(51) Int. Cl.
*B60L 1/00* (2006.01)
(52) U.S. Cl. .................................. 307/9.1; 307/150
(58) Field of Classification Search ................. 307/150, 307/9.1
See application file for complete search history.

(56) References Cited

U.S. PATENT DOCUMENTS

| | | |
|---|---|---|
| 602,966 A | 4/1898 | Wallach |
| 843,534 A | 2/1907 | Hewitt |
| 1,137,333 A | 4/1915 | Klorer |
| 1,604,870 A | 10/1926 | Asman |
| 1,803,571 A | 5/1931 | Ulman |
| 1,852,740 A | 4/1932 | Doane |
| 2,199,107 A | 4/1940 | Kibbe |
| 2,265,475 A | 12/1941 | Fodor |
| 2,353,063 A | 7/1944 | Otis |
| 2,686,866 A | 8/1954 | Williams |
| 2,726,116 A | 12/1955 | Barber |
| 2,731,547 A | 1/1956 | Callard |
| 3,047,765 A | 7/1962 | Vichill |
| 3,292,579 A | 12/1966 | Buchanan |
| 3,550,682 A | 12/1970 | Fowler |
| 3,551,091 A | 12/1970 | Veloz |
| 3,628,086 A | 12/1971 | Nuckolls |
| 3,641,336 A | 2/1972 | Boin |
| 3,743,989 A | 7/1973 | Nicolas et al. |
| 3,746,906 A | 7/1973 | Cardwell, Jr. |
| 3,867,661 A | 2/1975 | Waltz et al. |
| 3,885,185 A | 5/1975 | Tilley |
| 3,885,211 A | 5/1975 | Gutai |
| 3,923,663 A | 12/1975 | Reid |
| 3,938,018 A | 2/1976 | Dahl |
| 4,005,330 A | 1/1977 | Glascock, Jr. et al. |
| 4,010,400 A | 3/1977 | Hollister |
| 4,017,764 A | 4/1977 | Anderson |

(Continued)

FOREIGN PATENT DOCUMENTS

AT       370929       5/1983

(Continued)

OTHER PUBLICATIONS

"A Contactless Electrical Energy Transmission System for Portable-Telephone Battery Chargers", IEEE Transactions on Industrial Electronics, vol. 50, No. 3, Jun. 2003.

(Continued)

*Primary Examiner*—Robert L. DeBeradinis
(74) *Attorney, Agent, or Firm*—Warner Norcross & Judd LLP

(57) ABSTRACT

An inductive recharging station has an inductive power supply and a portable power station. The portable power station is movable with respect to the inductive power supply. In order to recharge portable devices, the devices are placed within the portable power station. When the portable power station is placed in proximity to the inductive recharging station, the devices are powered. If a device has a rechargeable battery, the battery is recharged.

4 Claims, 8 Drawing Sheets

U.S. PATENT DOCUMENTS

| | | |
|---|---|---|
| 4,038,625 A | 7/1977 | Tompkins et al. |
| 4,076,996 A | 2/1978 | Maehara |
| 4,093,893 A | 6/1978 | Anderson |
| 4,101,777 A | 7/1978 | Reid |
| 4,117,378 A | 9/1978 | Glascock, Jr. |
| 4,282,563 A | 8/1981 | Ohta et al. |
| 4,300,073 A | 11/1981 | Skwirut et al. |
| 4,389,595 A | 6/1983 | Kamei et al. |
| 4,414,489 A | 11/1983 | Young |
| 4,584,707 A | 4/1986 | Goldberg et al. |
| 4,615,799 A | 10/1986 | Mortensen |
| 4,637,434 A | 1/1987 | Moen |
| 4,675,573 A | 6/1987 | Miram et al. |
| 4,675,638 A | 6/1987 | Szabo |
| 4,747,158 A | 5/1988 | Goldberg et al. |
| 4,752,401 A | 6/1988 | Bodenstein |
| 4,762,613 A | 8/1988 | Snowball |
| 4,772,991 A | 9/1988 | Wood |
| 4,800,328 A | 1/1989 | Bolger et al. |
| 4,812,702 A | 3/1989 | Anderson |
| 4,816,977 A | 3/1989 | Sorensen |
| 4,818,855 A | 4/1989 | Mongeon et al. |
| 4,838,797 A | 6/1989 | Dodier |
| 4,854,214 A | 8/1989 | Lowe |
| 4,857,204 A | 8/1989 | Joklik |
| 4,894,591 A | 1/1990 | Witting |
| 4,954,756 A | 9/1990 | Wood et al. |
| 4,958,266 A | 9/1990 | Sorensen et al. |
| 4,968,437 A | 11/1990 | Noll et al. |
| 4,971,687 A | 11/1990 | Anderson |
| 4,972,120 A | 11/1990 | Witting |
| 4,977,354 A | 12/1990 | Bergervoet et al. |
| 5,030,889 A | 7/1991 | El-Hamamsy et al. |
| 5,039,903 A | 8/1991 | Farrall |
| 5,041,763 A | 8/1991 | Sullivan et al. |
| 5,054,112 A | 10/1991 | Ike |
| 5,070,293 A | 12/1991 | Ishii et al. |
| 5,101,332 A | 3/1992 | Hsia |
| 5,122,729 A | 6/1992 | Itoga et al. |
| 5,141,325 A | 8/1992 | Huang |
| 5,146,140 A | 9/1992 | Piejak et al. |
| 5,158,361 A | 10/1992 | Huang |
| 5,184,891 A | 2/1993 | Shpigel |
| 5,216,402 A | 6/1993 | Carosa |
| 5,229,652 A | 7/1993 | Hough |
| 5,264,997 A | 11/1993 | Hutchisson et al. |
| 5,280,416 A | 1/1994 | Hartley et al. |
| 5,289,085 A | 2/1994 | Godyak et al. |
| 5,300,860 A | 4/1994 | Godyak et al. |
| 5,301,096 A | 4/1994 | Klontz et al. |
| 5,311,028 A | 5/1994 | Glavish |
| 5,339,233 A | 8/1994 | Yang |
| 5,341,280 A | 8/1994 | Divan et al. |
| 5,367,242 A | 11/1994 | Hulman |
| 5,416,388 A | 5/1995 | Shackle |
| 5,422,519 A | 6/1995 | Russell |
| 5,450,305 A | 9/1995 | Boys et al. |
| 5,455,466 A | 10/1995 | Parks et al. |
| 5,455,467 A * | 10/1995 | Young et al. ................ 307/104 |
| 5,465,025 A | 11/1995 | Hendrickson |
| 5,506,560 A | 4/1996 | Takeuchi et al. |
| 5,536,979 A | 7/1996 | McEachern et al. |
| 5,550,452 A | 8/1996 | Shirai et al. |
| 5,553,312 A | 9/1996 | Gattey et al. |
| 5,594,304 A | 1/1997 | Graber |
| 5,596,567 A | 1/1997 | deMuro |
| 5,600,225 A | 2/1997 | Goto |
| 5,611,918 A | 3/1997 | Markham |
| 5,619,182 A | 4/1997 | Robb |
| 5,653,531 A | 8/1997 | Yang |
| 5,675,677 A | 10/1997 | Davenport et al. |
| 5,680,028 A | 10/1997 | McEachern |
| 5,716,126 A | 2/1998 | Meyer |
| 5,734,254 A | 3/1998 | Stephens |
| 5,747,894 A | 5/1998 | Hirai et al. |
| 5,771,438 A | 6/1998 | Palermo et al. |
| 5,814,900 A | 9/1998 | Esser et al. |
| 5,831,348 A | 11/1998 | Nishizawa |
| 5,831,516 A | 11/1998 | Jennings |
| 5,834,905 A | 11/1998 | Godyak et al. |
| 5,905,343 A | 5/1999 | McCamant |
| 5,923,544 A | 7/1999 | Urano |
| 5,928,505 A | 7/1999 | Inakagata et al. |
| 5,929,598 A | 7/1999 | Nakama et al. |
| 5,949,155 A | 9/1999 | Tamura et al. |
| 5,951,155 A | 9/1999 | Lanser |
| 5,952,814 A | 9/1999 | VanLergerghe |
| 5,963,012 A | 10/1999 | Garcia |
| 5,980,056 A | 11/1999 | West |
| 5,990,611 A | 11/1999 | Lee |
| 6,005,304 A | 12/1999 | Seelig |
| 6,020,682 A | 2/2000 | Holzer |
| 6,027,225 A | 2/2000 | Martin et al. |
| 6,028,413 A | 2/2000 | Brockmann |
| 6,075,433 A | 6/2000 | Ono et al. |
| 6,118,249 A | 9/2000 | Brockmann et al. |
| 6,160,371 A | 12/2000 | Tachikawa |
| 6,161,032 A | 12/2000 | Acker |
| 6,166,494 A | 12/2000 | Green |
| 6,184,651 B1 | 2/2001 | Fernandez |
| 6,188,179 B1 | 2/2001 | Boys et al. |
| 6,194,828 B1 | 2/2001 | Kohne et al. |
| 6,218,785 B1 | 4/2001 | Incerti |
| 6,241,359 B1 | 6/2001 | Lin |
| 6,252,380 B1 | 6/2001 | Koenck |
| 6,263,247 B1 | 7/2001 | Mueller et al. |
| 6,275,143 B1 | 8/2001 | Stobbe |
| 6,280,066 B1 | 8/2001 | Dolan |
| 6,291,936 B1 | 9/2001 | MacLennan et al. |
| 6,301,128 B1 * | 10/2001 | Jang et al. ................ 363/17 |
| 6,307,316 B1 | 10/2001 | Holzer |
| 6,322,226 B1 | 11/2001 | Dickson |
| 6,326,739 B1 | 12/2001 | MacLennan et al. |
| 6,339,296 B1 | 1/2002 | Goral |
| 6,345,203 B1 | 2/2002 | Mueller et al. |
| 6,436,299 B1 | 8/2002 | Baarman et al. |
| 6,459,882 B1 | 10/2002 | Palermo et al. |
| 6,462,432 B1 | 10/2002 | Seelig et al. |
| 6,571,949 B2 * | 6/2003 | Burrus et al. ................ 206/373 |
| 6,577,098 B2 * | 6/2003 | Griffey et al. ................ 320/104 |
| 6,597,076 B2 | 7/2003 | Scheible et al. |
| 6,803,744 B1 * | 10/2004 | Sabo ................ 320/108 |
| 6,934,167 B2 | 8/2005 | Jang |
| 7,109,682 B2 * | 9/2006 | Takagi et al. ................ 320/108 |
| 7,201,611 B2 * | 4/2007 | Faranda ................ 439/638 |
| 7,212,414 B2 * | 5/2007 | Baarman ................ 363/16 |
| 2002/0154518 A1 | 10/2002 | Elferich |
| 2003/0006880 A1 | 1/2003 | Zimmer |
| 2003/0214821 A1 | 11/2003 | Giannopoulos |
| 2003/0222769 A1 | 12/2003 | Mau |
| 2004/0150944 A1* | 8/2004 | Byrne et al. ................ 361/683 |
| 2005/0156564 A1* | 7/2005 | Krieger ................ 320/112 |
| 2006/0043927 A1* | 3/2006 | Beart et al. ................ 320/108 |

FOREIGN PATENT DOCUMENTS

| | | |
|---|---|---|
| AU | A-61741/86 | 2/1988 |
| DE | 2029468 | 12/1971 |
| DE | 4100272 | 7/1991 |
| DE | 9012505 | 8/1991 |
| DE | 4238388 | 5/1994 |
| DE | 4421253 | 3/1995 |
| DE | 4412957 | 10/1995 |
| DE | 19540854 | 5/1997 |

| | | |
|---|---|---|
| EP | 0825577 | 2/1998 |
| EP | 1209791 A2 | 11/2001 |
| GB | 1349788 | 4/1974 |
| GB | 2388715 A | 11/2003 |
| GB | 2388716 A | 11/2003 |
| JP | 8-31585 | 2/1996 |
| WO | WO 97/17761 | 5/1997 |
| WO | WO 97/26704 | 7/1997 |
| WO | WO 00/22892 | 4/2000 |
| WO | WO 00/32298 | 6/2000 |
| WO | WO 00/54387 | 9/2000 |
| WO | WO0054387 | 9/2000 |
| WO | WO 01/26427 | 4/2001 |
| WO | WO 01/26431 | 4/2001 |
| WO | WO 01/80396 A1 | 10/2001 |
| WO | WO 03/096361 | 11/2003 |
| WO | WO 03/105311 | 12/2003 |

OTHER PUBLICATIONS

"Best of Show", Fortune, Feb. 17, 2003.
"Splashpower", www.splashpower.com, Feb. 11, 2003.
"Mobilewise", www.mobile.com, Feb. 11, 2003.
Gulko, Michael, et al, Inductor-Controlled Current-Sourcing Resonant Inverter and its Application as a High Pressure Discharge Lamp Driver, IEEE, pp. 434-440, May 1994.

* cited by examiner

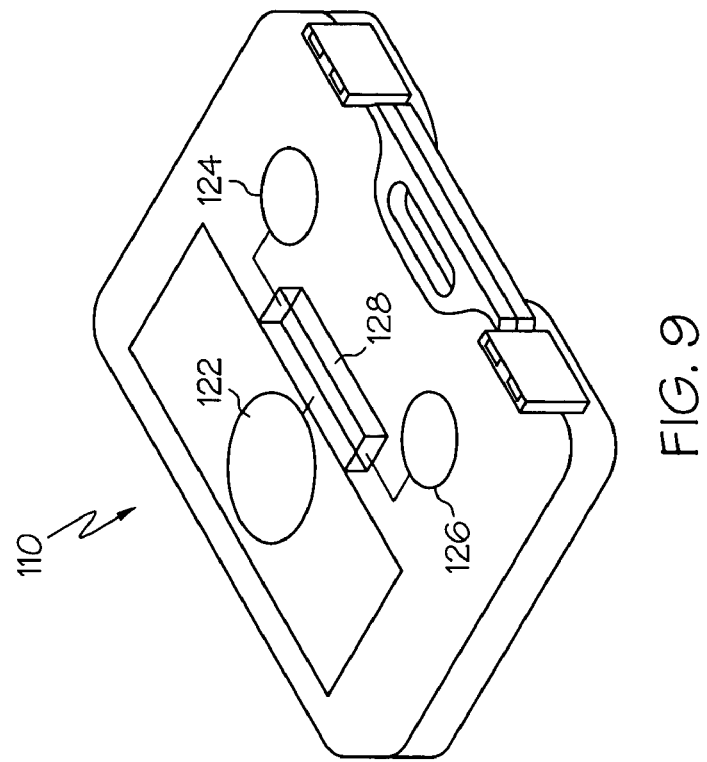
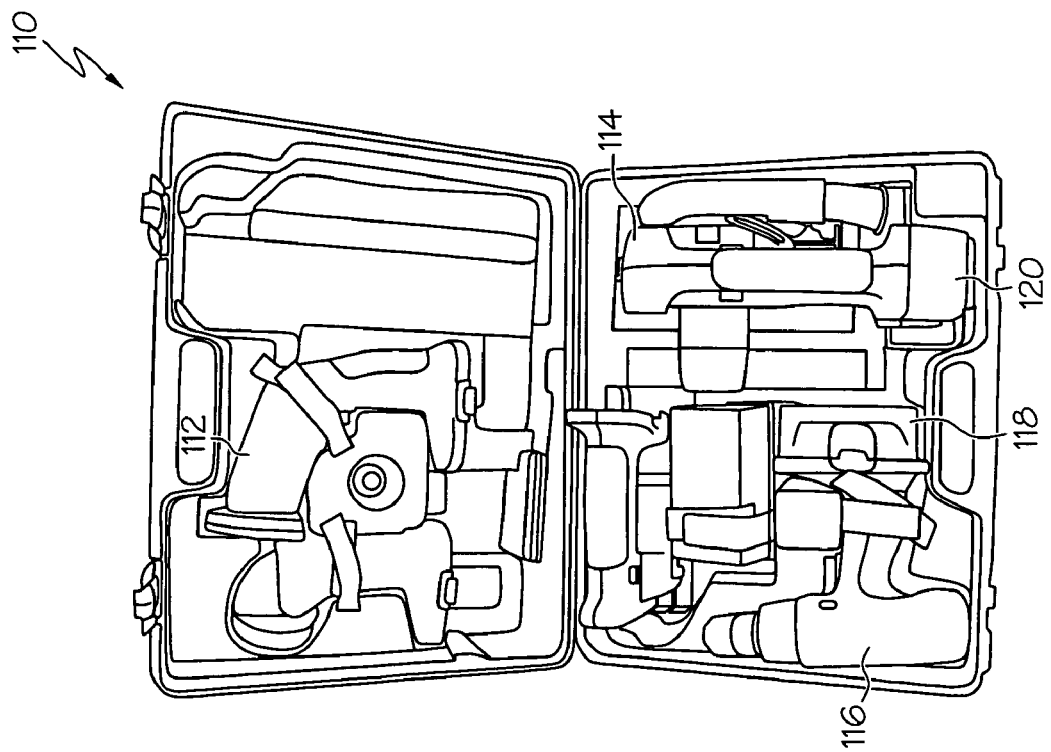

PORTABLE INDUCTIVE POWER STATION

BACKGROUND OF THE INVENTION

Battery powered handheld tools such as drills, saws, and vacuum cleaners, have proven very popular. Such a handheld tool usually has a rechargeable battery, referred to generally as a "power pack", attached at some location on the tool. The power pack has to be periodically recharged. In order to recharge the power pack, the power pack is removed from the tool and placed in a recharging cradle. The recharging cradle is connected to a source of AC power. After the power pack is charged, the power pack is placed once again on the tool.

While battery powered handheld tools have proven very useful, they do have drawbacks. The power pack must be regularly recharged. If not, the tool will cease to function. Further, the power pack is usually plugged into an AC outlet separate from the handheld tool, which is inconvenient to a user and may lead to the loss of the power pack.

Finally, battery powered handheld tools are so popular that a person or entity may have, use, sell or rent several such tools. Often, each battery is unique for each handheld tool, requiring the person or entity to have a myriad number of recharging cradles, wires, and outlets.

A system for recharging battery powered handheld tools without the attendant problems is thus highly desirable.

BRIEF DESCRIPTION OF THE DRAWINGS

FIG. 8 shows an embodiment of a multi-tool case.

FIG. 9 shows the exterior of the multi-tool case.

DETAILED DESCRIPTION OF THE DRAWINGS

Figure 1:
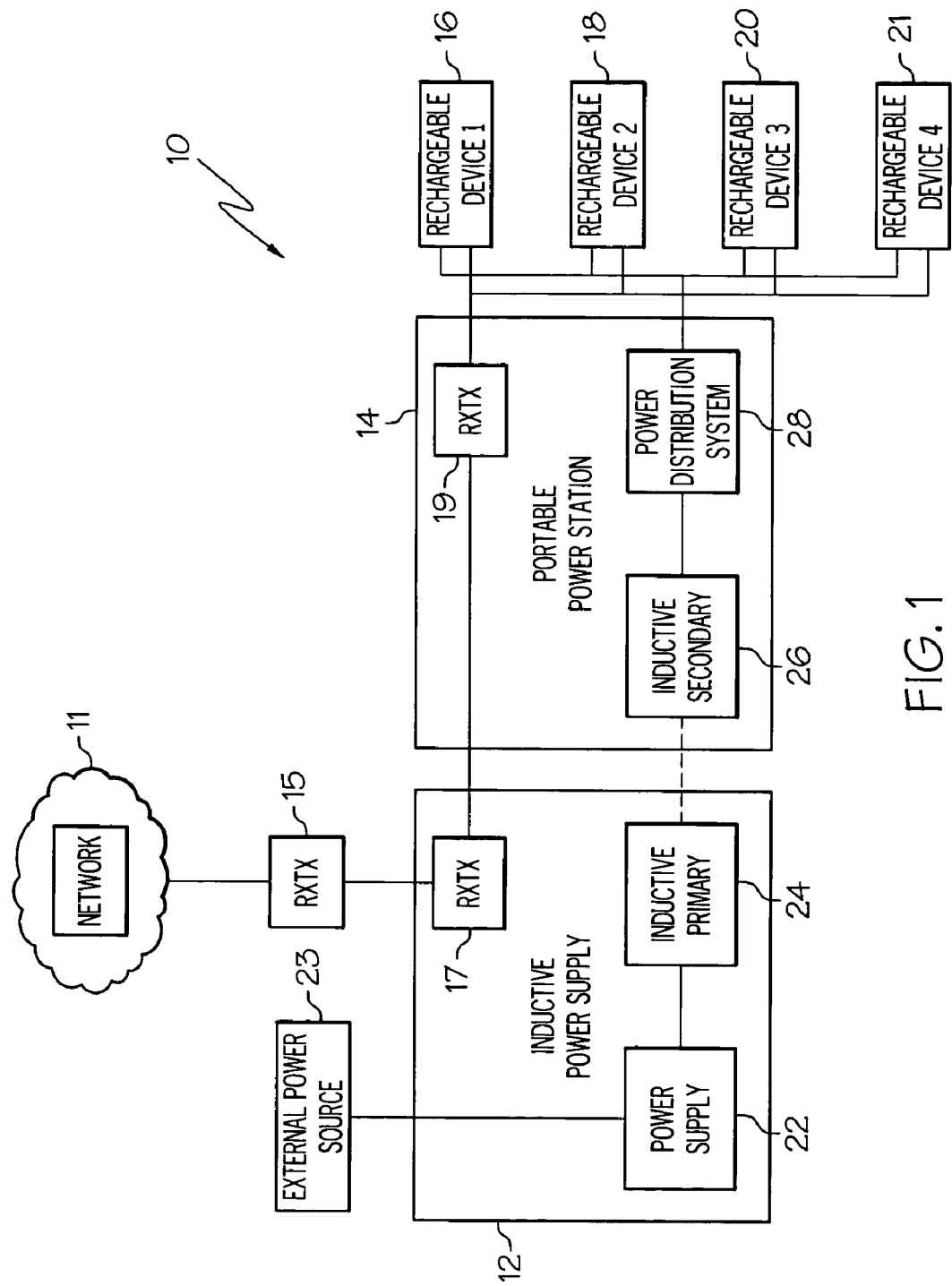
FIG. 1 is a block diagram of inductive recharging station.

FIG. 1 shows a block diagram of inductive recharging station 10. Inductive power supply 12 inductively energizes portable power station 14. Portable power station 14 then provides power to recharge a plurality of rechargeable devices 16, 18, 20, 21. Inductive power supply 12 is connected to an external power source 23. External power source 23 could be a source of AC power, such as 110 V AC, or DC power, such as a conventional 12 V DC vehicle battery, or any other type of electric power.

Inductive power supply 12 includes power supply 22 and inductive primary 24. Power supply 22 converts the power from external power source 23 into electrical power for powering the inductive recharging station 10. When portable power station 14 is placed within proximity of inductive primary 24, inductive secondary 26 is energized and supplies power to power distribution system 28. Power distribution system 28 then supplies power to rechargeable devices 16, 18, 20, 22.

Inductive power supply 12 could be an adaptive inductive power supply, such as those described in detail in U.S. Pat. No. 6,731,071 issued May 4, 2004 and entitled "Inductively Powered Lamp Assembly"; patent application Ser. No. 10/357,932, filed Feb. 4, 2003 and entitled "Inductively Powered Apparatus"; patent application Ser. No. 10/689,224, filed Oct. 20, 2003 and entitled "Inductive Coil Assembly"; patent application Ser. No. 10/246,155, filed Sep. 18, 2002 and entitled "Inductively Coupled Ballast Circuit"; patent application Ser. No. 10/689,499, filed Oct. 20, 2003 and entitled "Adaptive Inductive Power Supply"; and patent application Ser. No. 10/689,148, filed Oct. 20, 2003 and entitled "Adaptive Inductive Power Supply With Communication", which are hereby incorporate by reference.

Inductive power station 10 could include external RXTX 15 (transceiver). External RXTX 15 is coupled to network 11 and allows communication with inductive power supply RXTX 17. Inductive power supply RXTX 17 then relays any communication to portable power station RXTX 19, which then forwards the communication to rechargeable devices 16, 18, 20, 21. The communication protocol between the various devices could include 802.11b, 802.11g, power line communication, Bluetooth, cellular, or any of the other myriad types of communication schemas. As shown, communication could be managed by inductive power supply 12. However, communication could flow directly from external RXTX 15 to portable power station RXTX 19.

Figure 2:
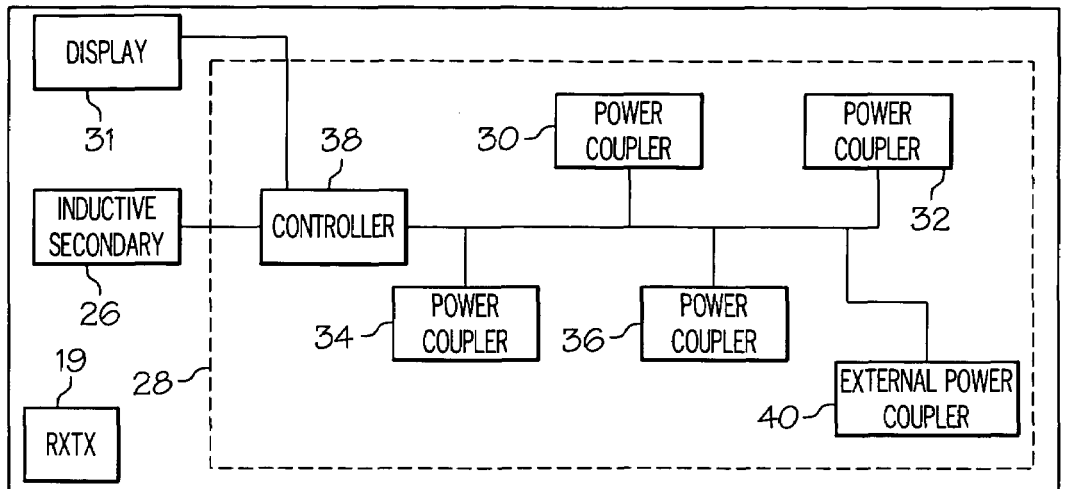
FIG. 2 shows the portable power station block diagram in more detail.

FIG. 2 shows portable power station 14 in more detail. Power distribution system 28 comprises several power couplers 30, 32, 34, 36. Power couplers 30, 32, 34, 36 could be physical connectors, whereby a portable device would be physically connected to the power coupler. Alternatively, power couplers 30, 32, 34, 36 could be an adaptive inductive primary for power transfer for an adaptive inductive power supply such as those described in detail in U.S. Pat. No. 6,731,071 issued May 4, 2004 and entitled "Inductively Powered Lamp Assembly"; patent application Ser. No. 10/357,932, filed Feb. 4, 2003 and entitled "Inductively Powered Apparatus"; patent application Ser. No. 10/689,224, filed Oct. 20, 2003 and entitled "Inductive Coil Assembly"; patent application Ser. No. 10/246,155, filed Sep. 18, 2002 and entitled "Inductively Coupled Ballast Circuit"; patent application Ser. No. 10/689,499, filed Oct. 20, 2003 and entitled "Adaptive Inductive Power Supply"; and patent application Ser. No. 10/689,148, filed Oct. 20, 2003 and entitled "Adaptive Inductive Power Supply With Communication", which are hereby incorporate by reference.

Portable power station 14 could also include controller 38. Controller 38 would monitor the various devices receiving power from inductive power supply 26 and control the power provided to the devices. For example, controller 38 could maximize the efficiency of the system so that power is optimally transferred from inductive power supply 26 to the rechargeable devices. Alternatively, controller 38 could prioritize the supply of power to the rechargeable devices in accordance with an established hierarchy so that some rechargeable devices are charged before other devices.

Power couplers 30, 32, 34, 36 could be specially adapted for a particular device. For example, one power coupler could be a pair of contacts for interfacing with contacts on a rechargeable device, another power coupler could be a conventional inductive coupler, a third could be an adaptive inductive power coupler, and a fourth could provide both power and communication. Alternatively, all four power couplers could be the same type of coupler.

Figure 2A:
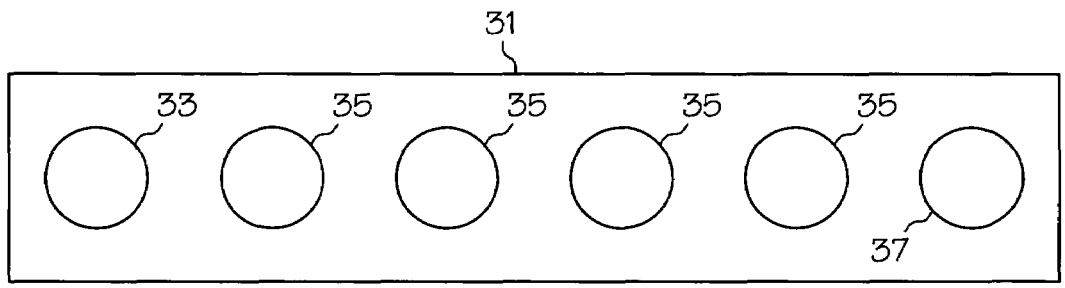
FIG. 2a shows one embodiment of a display.

In order to provide information regarding the status of portable power station 14, optional display 31 is coupled to controller 38. Display 31 is shown in FIG. 2A. In accordance with one embodiment, indicator 33 is energized whenever portable power station 14 is receiving power from inductive power supply 12. Lights 35 are energized when power is being supplied by one of the power coupler 30, 32, 34, 36. Light 37 is energized when power is being supplied by external power coupler 40. Display 31 could be an LCD (liquid crystal diode) display or a series of LED (light emitting diode).

Portable power station 14 could also include external power coupler 40. External power coupler 40 converts power from inductive power supply 26 into conventional power, such as 60 Hz 110V AC power. External power coupler 40 could be as simple as a transformer, or it could be a conventional inverter. External power coupler 40 could supply AC power or DC power, or both, through several external outlets. A user would therefore plug an AC or DC device directly into portable power station 14.

Figure 3:
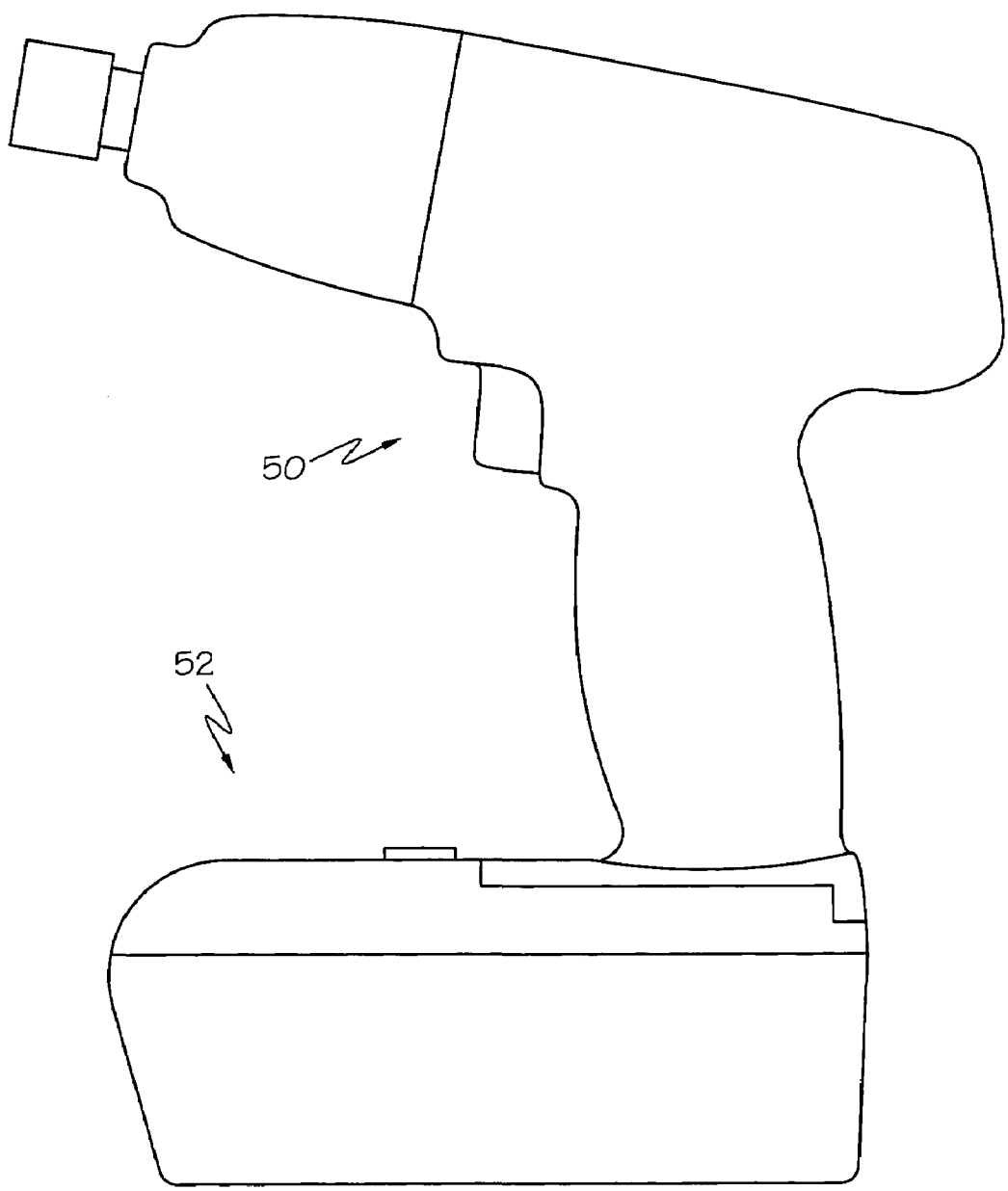
FIG. 3 shows a portable tool.

FIG. 3 shows portable tool 50. Portable tool 50 is shown as a portable drill, but it could also be, for example, a reciprocating or circular saw, a screwdriver, a vacuum cleaner, a rechargeable flashlight, a radio, a computer, a media player or any other portable tool. Portable tool 50 also includes rechargeable power supply 52. Rechargeable power supply 52 could be removable from portable tool 50 or it could be permanently affixed to portable tool 50.

Figure 4:
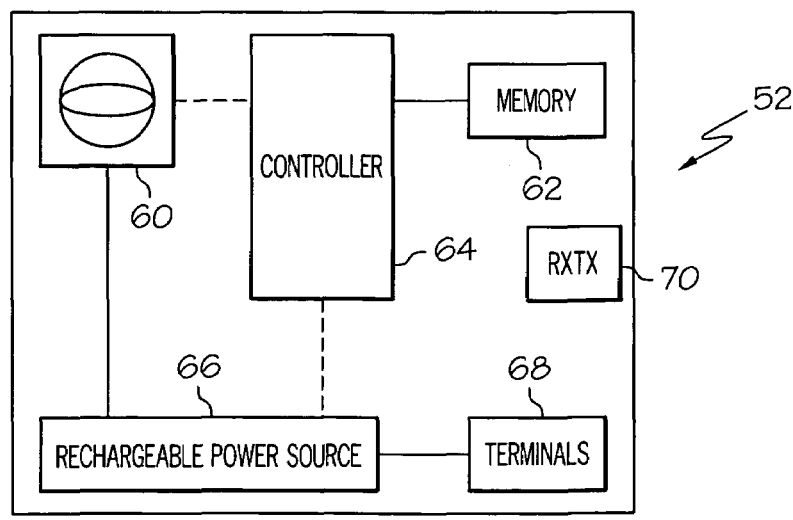
FIG. 4 is a block diagram of the power pack for the portable tool shown in FIG. 3.

FIG. 4 is a block diagram of power pack 52 for portable tool 50. Power pack 52 also includes secondary 60. Secondary 60 could be a triaxial multi-coil primary described in U.S. patent application Ser. No. 10/689,224, filed Oct. 20, 2003 and entitled "Inductive Coil Assembly", which is hereby incorporated by reference. Power pack 52 includes memory 62, controller 64, rechargeable power source 66, and terminals 68. Controller 64 could be a microcontroller or a microprocessor, depending upon the specific requirements for operation of portable tool 50.

Briefly, secondary 60 receives power from an inductive primary. Controller 64 regulates the recharging of rechargeable power source 66. Memory 62 contains information regarding power pack 52 and rechargeable tool 50. This information can be communicated to the inductive power supply in order to better control the recharging of power pack 52 as well as any other rechargeable devices receiving power from the inductive power supply. The inter-operation of controller 64, rechargeable power source 66, and secondary 60 are described in more detail in U.S. patent application Ser. No. 10/689,148, filed Oct. 20, 2003 and entitled "Adaptive Inductive Power Supply With Communication" which is hereby incorporated by reference.

Power pack 52 could also include power tool RXTX 70. Power tool RXTX 70 is a communication interface for power tool 50 and power pack 52. If power tool 50 contained a memory, power tool RXTX 70 could provide a communication link with network 11. Power tool RXTX 70 is shown here as part of power pack 52. Power tool RXTX 70 could also be located within power tool 50 rather than in power pack 52.

Because the power tool RXTX 70 is designed to work specifically with power station RXTX 19, power tool RXTX 70 need not be able to communicate in a plethora of different protocols. Rather, power tool RXTX 70 need only be able to communicate in the same protocol as that of power station RXTX 19. The task of translating between the various protocols of network 11 would fall to one of the other RXTXs 17, 19, 15. Thus, the computing power and hardware required within power tool RXTX 70 would be minimized.

Figure 5:
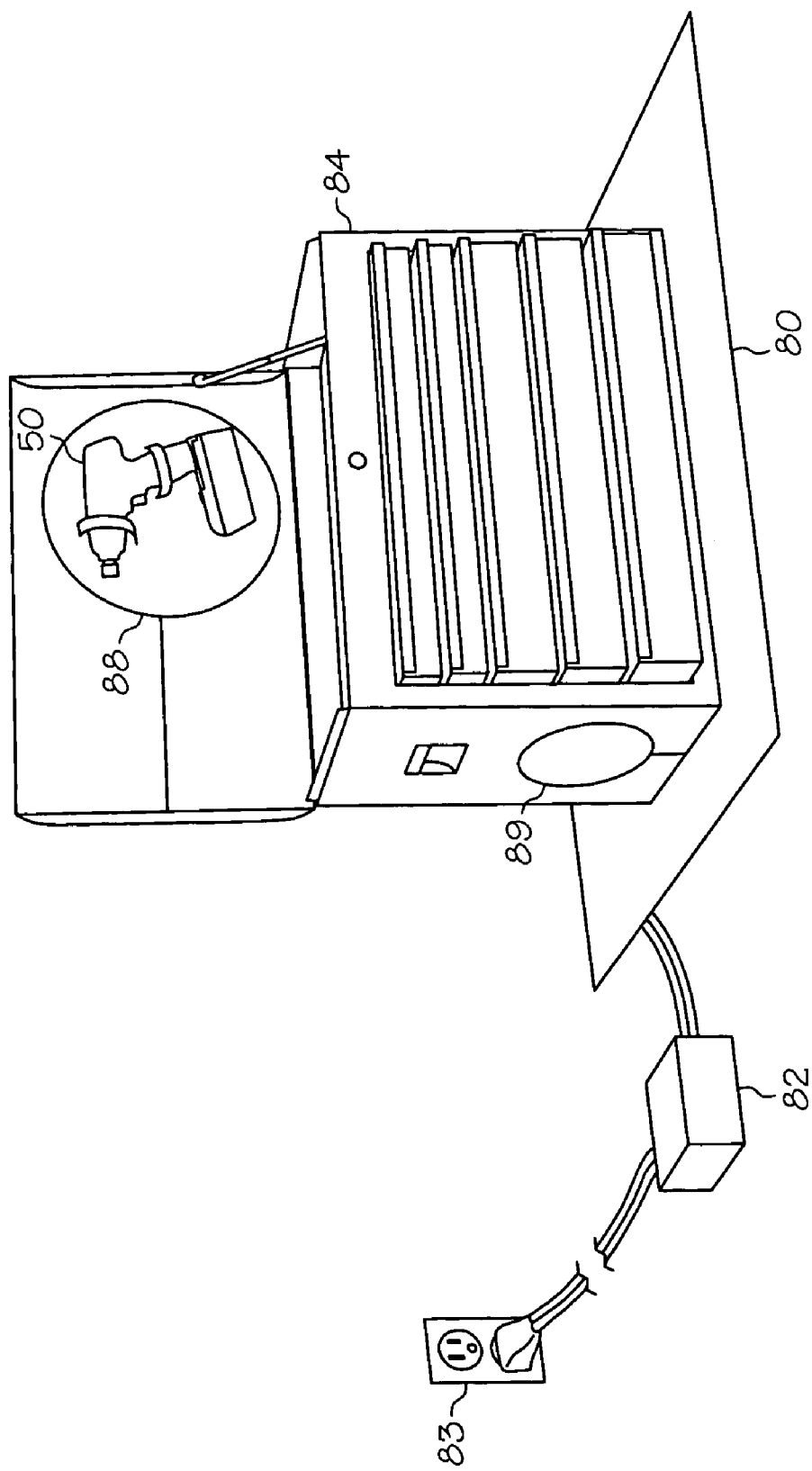
FIG. 5 show a tool box having a portable power station.

Inductive recharging station 10 could have a variety of physical configurations. FIG. 5 shows one configuration. Inductive power supply 12 could be in the form of a mat with the inductive primary incorporated into mat 80. Power supply 22 is located within enclosure 82, and is connected to power outlet 83. Obviously, depending upon the sizes of the components and the power requirements, power supply 22 could be incorporated within mat 80. In the embodiment shown, portable power station 14 has been incorporated within tool box 84.

In this configuration, power couplers 32, 34, 36, 38 could be incorporated within the walls of tool box 84. Inductive secondary 26 could also be incorporated within the base of tool box 84. Power would be transferred from to from the inductive primary in mat 80 to the inductive secondary located within the base of tool box 84. Power would then be transferred to the various power couplers located within tool box 84.

As shown in FIG. 5, tool box 84 is provided with retainers to attach power tool 50 in a fixed position with relative to power coupler 88. According to one embodiment, power coupler 88 is designed to work exclusively with power tool 50, and therefore power coupler 88 could have operating characteristics designed specifically for power tool 50. Other power couplers contained within tool box 84 could also be specifically designed for each of several power tools contained within the tool box. Attachment means for attaching a power tool near its respective power couple could also be provided.

An additional or alternative power coupler placement is illustrated by power coupler 89. According to this embodiment, power tool 50 is not attached to power coupler 50, but is instead placed within a proximity that provide inductive power transfer between power coupler 89 and power tool 50. According to this embodiment, coupler 89 could be a general purpose coupler or one tailored for a specific power tool.

Figure 6:
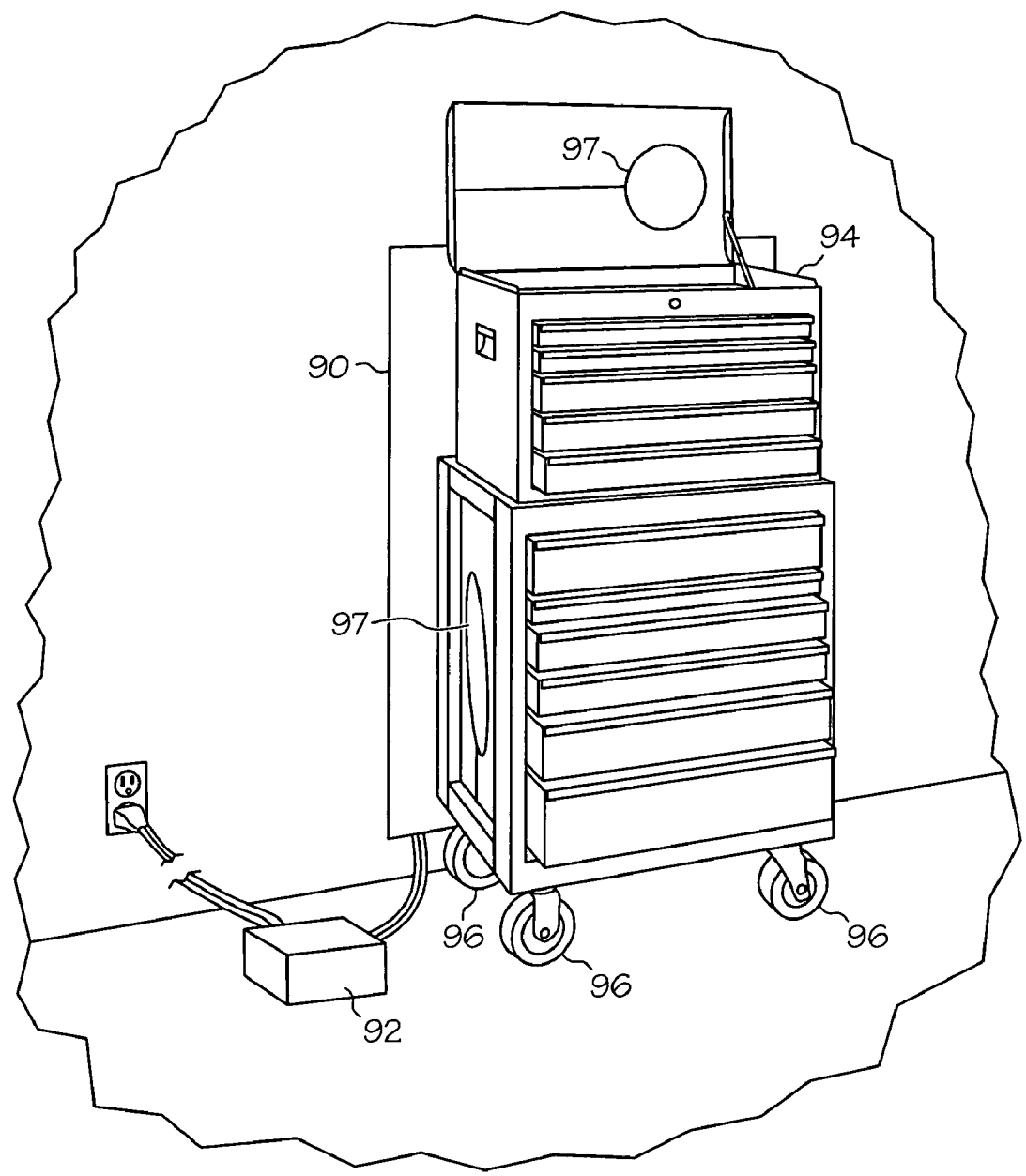
FIG. 6 shows a wheeled tool box having a portable power station.

FIG. 6 shows an additional configuration for the portable power station. Mat 90 contains the inductive primary. As before, the power supply and other electronics for the inductive power supply could be within enclosure 92, although those items could be incorporated within mat 90. According to one embodiment, the inductive secondary is contained within the back wall of tool box 94. Tool box 94 has one or more power couplers 97 and is provided with wheels 96. Power couplers 97 could also be positioned within one or more drawers of tool box 94. If rechargeable devices were placed within tool box 94, tool box 94 could then be positioned near mat 90, and power would then be transferred to the rechargeable devices located within tool box 94.

Figure 7:
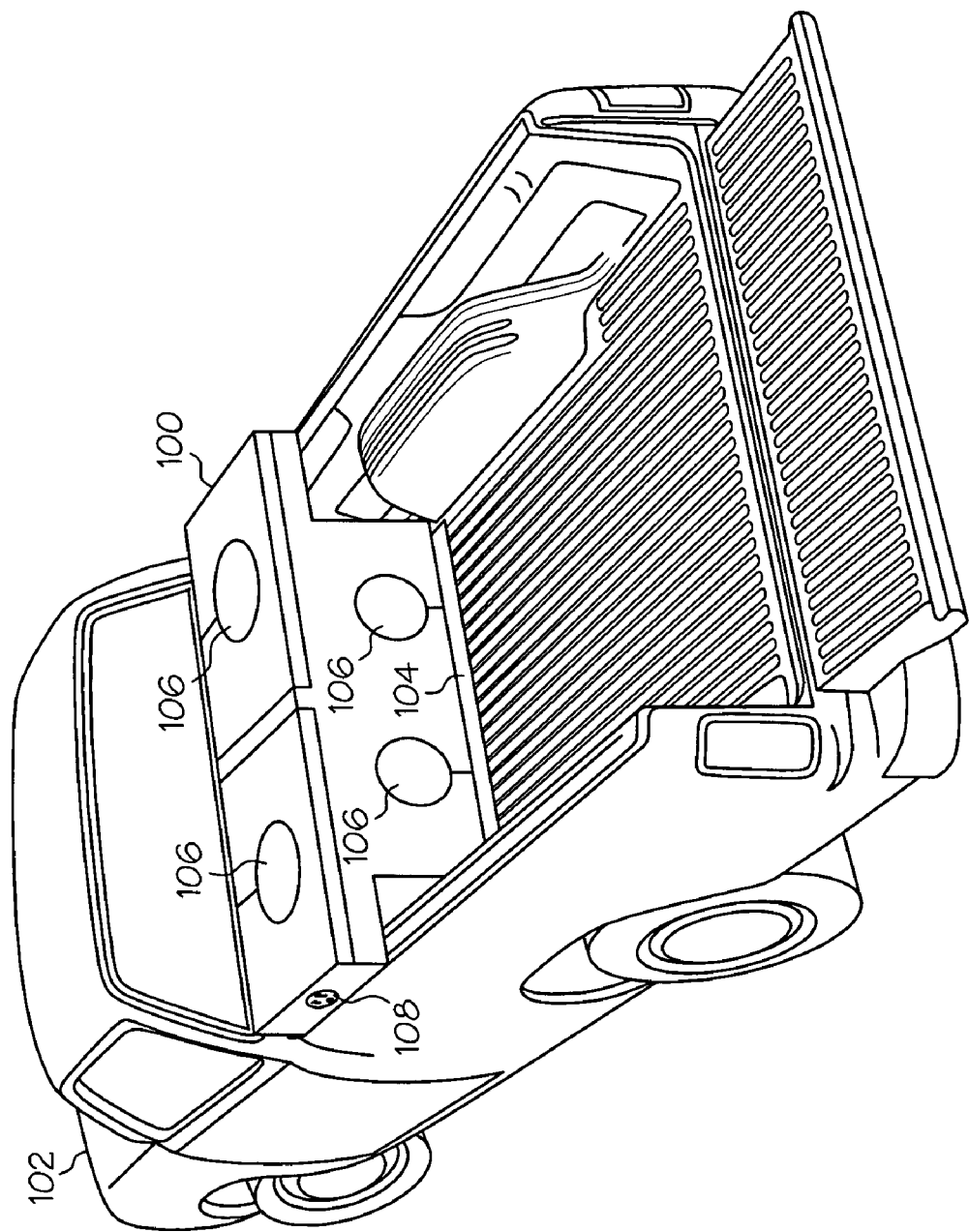
FIG. 7 shows a tool box for a truck having a portable power station.

FIG. 7 shows a further configuration for the portable power station. Tool box 100 is located on or within vehicle 102. Inductive power supply 104 is incorporated within the body of vehicle 102. Power couplers 106 could be incorporated within the walls of tool box 100 or could be external to tool box 100. External power outlet 108 is a standard power outlet, which could be AC or DC. Obviously, multiple external power outlets could be provided. Inductive power supply 104 is connected to the electrical power system of vehicle 102.

Vehicles incorporating an inductive power supply system are described in more detail in U.S. patent application Ser. No. 10/871,420, filed Jun. 18, 2004 and entitled "Vehicle Interface" which is hereby incorporated by reference.

FIG. 8 shows a further embodiment. Multi-tool case 110 includes specific locations for various power tools such as sander 112, saw 114 and drill 116. Power pack 118 is used to power drill 116 while power pack 120 is used to power saw 114.

FIG. 9 shows the exterior of multi-tool case 110. Multi-tool case 110 has inductive secondary 122. Power couplers 124, 126 supply power to power packs 118, 120. Controller 128 manages the power distribution from inductive secondary 122 to power couplers 124, 126. In this embodiment, power coupler 124, 126 are shown as inductive primaries to be coupled to inductive secondaries within power packs 118, 120. Alternatively, power couplers 124, 126 could be physical connections with power packs 118, 120. Multi-tool case 110 would be placed in proximity to a pad similar to pad 80 shown in FIG. 5. Power packs 118, 120 would thereby be charged without the need to remove them from multi-tool case 110.

Figure 11:
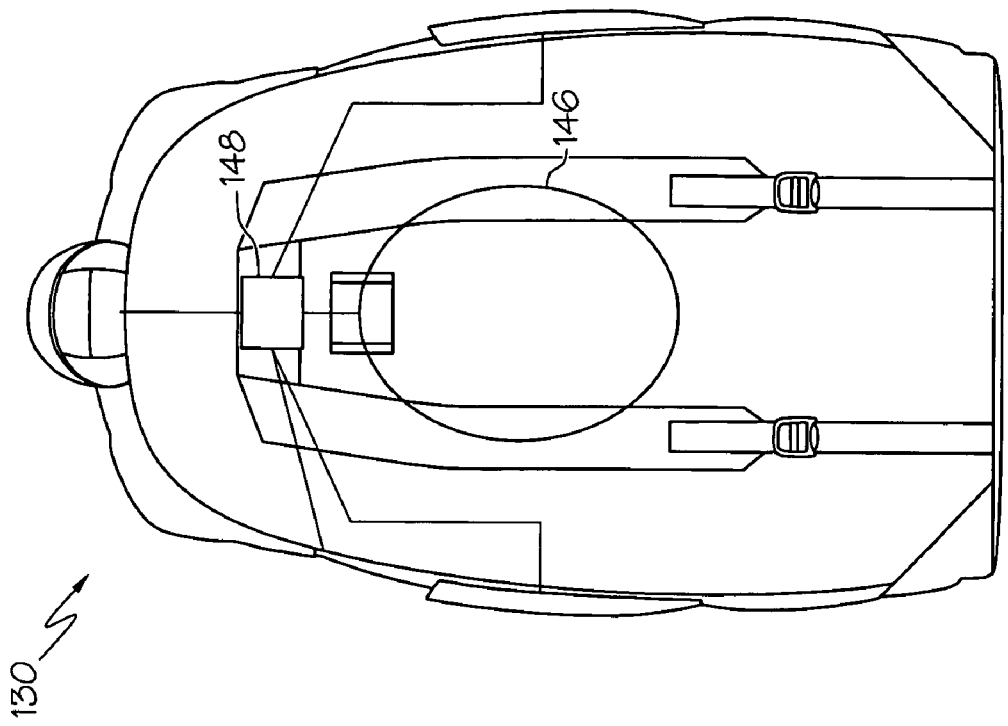
FIG. 11 shows the rear of the backpack.
Figure 10:
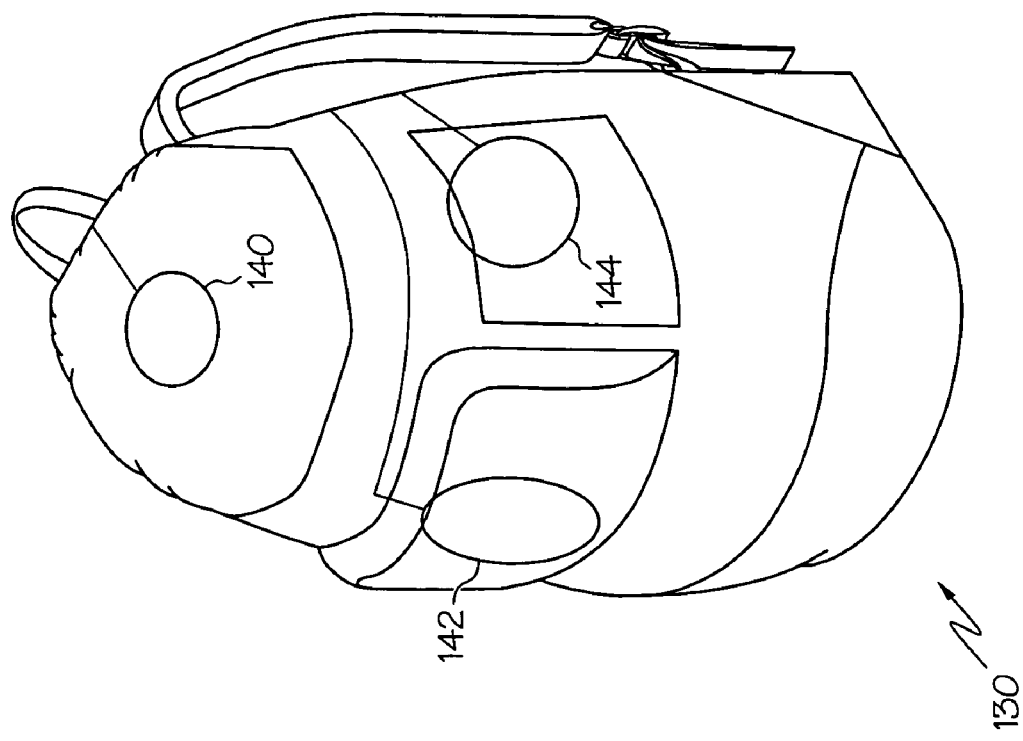
FIG. 10 shows one embodiment of a backpack.

FIG. 10 shows backpack 130. Backpack 130 has multiple power couplers 140, 142, 144 located at different positions on backpack 130. Power couplers 140, 142, 144 could be contained within the fabric of backpack 130, located on the exterior of backpack 130, or located on the interior of backpack 130. FIG. 11 shows the rear of backpack 130. Power couplers 140, 142, 144 are coupled to inductive secondary 146 by way of controller 148. Controller 148 could manage the power supplied to power couplers 140, 142, 144. In operation, various portable devices equipped with a suitable power coupler, such as an inductive coupler, could be placed within backpack 130. When backpack 130 is placed within proximity of a mat similar to that shown in FIG. 5, then power received by inductive secondary 146 would be used to charge or power the devices.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A portable recharging toolbox comprising:
   a first inductor for receiving AC electrical power inductively from an inductive power supply;
   a power distribution system electrically coupled to the first inductor, where the power distribution system receives the AC electrical power from the first inductor and distributes the electrical power to a device; and
   where the toolbox has a base, and the first inductor is located in the base.

2. A portable recharging toolbox comprising:
   a first inductor for receiving AC electrical power inductively from an inductive power supply;
   a power distribution system electrically coupled to the first inductor, where the power distribution system receives the AC electrical power from the first inductor and distributes the electrical power to a device; and
   where the toolbox has at least one sidewall, and the inductor is located in the sidewall.

3. A portable recharging toolbox comprising:
   a first inductor for receiving AC electrical power inductively from an inductive power supply;
   a power distribution system electrically coupled to the first inductor, where the power distribution system receives the AC electrical power from the first inductor and distributes the electrical power to a device; and
   where the toolbox has at least one sidewall, and the inductor is located on the sidewall.

4. A vehicle comprising:
   a vehicle power supply;
   an inductive power supply incorporated within the vehicle and electrically coupled to the vehicle power supply, where the inductive power supply is partially located within a floor of the vehicle;
   a portable power station, inductively powered by the inductive power supply, movable with respect to the inductive power supply, the portable power station having a power distribution system capable of energizing a plurality of devices.

\* \* \* \* \*